(12) United States Patent
    Park

(10) Patent No.: US 9,048,487 B2
(45) Date of Patent: Jun. 2, 2015

(54) SECONDARY BATTERY AND MANUFACTURING METHOD THEREOF

(75) Inventor: Yongkyun Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1111 days.

(21) Appl. No.: 13/051,981

(22) Filed: Mar. 18, 2011

(65) Prior Publication Data

US 2012/0064385 A1    Mar. 15, 2012

Related U.S. Application Data

(60) Provisional application No. 61/382,392, filed on Sep. 13, 2010.

(51) Int. Cl.

| | |
|---|---|
| H01M 2/18 | (2006.01) |
| H01M 2/14 | (2006.01) |
| H01M 2/02 | (2006.01) |
| H01M 10/04 | (2006.01) |
| H01M 10/0585 | (2010.01) |

(52) U.S. Cl.
    CPC .............. *H01M 2/14* (2013.01); *H01M 2/0212* (2013.01); *H01M 2/18* (2013.01); *H01M 10/0413* (2013.01); *H01M 10/0436* (2013.01); *H01M 10/0468* (2013.01); *H01M 10/0585* (2013.01)

(58) Field of Classification Search
    CPC ......... H01M 2/18; H01M 4/13; H01M 4/139; H01M 10/0486; H01M 10/0525; H01M 10/058; H01M 2/1673; H01M 10/0413; Y02E 60/122
    USPC .......................... 429/139, 136, 144; 29/623.5
    See application file for complete search history.

(56) References Cited

U.S. PATENT DOCUMENTS

| | | | |
|---|---|---|---|
| 2002/0182490 A1* | 12/2002 | Cho et al. ...................... | 429/144 |
| 2005/0277022 A1 | 12/2005 | Kozuki | |

(Continued)

FOREIGN PATENT DOCUMENTS

| | | |
|---|---|---|
| DE | 10 2007 025 766 A1 | 11/2008 |
| EP | 0 136 886 A2 | 4/1985 |

(Continued)

OTHER PUBLICATIONS

Extended European Search Report dated Nov. 4, 2011 in EP application 11180796.2, 8 pages.

(Continued)

*Primary Examiner* — Gary Harris
(74) *Attorney, Agent, or Firm* — Christie, Parker & Hale, LLP

(57) ABSTRACT

A secondary battery which can maintain alignment between a first electrode plate and a second electrode plate and can improve the cell stability and life characteristic of the battery, and a manufacturing method thereof. A secondary battery includes an electrode assembly including a first electrode plate; a second electrode plate; a first separator between the first electrode plate and the second electrode plate and including a central portion and an outer portion at a periphery of the central portion; and a second separator at a side of the first electrode plate or the second electrode plate opposite a side facing the first separator, the second separator including a central portion and an outer portion at a periphery of the central portion of the second separator, and the outer portion of the first separator and the outer portion of the second separator contact each other at least at a joining part.

13 Claims, 4 Drawing Sheets

(56) References Cited

U.S. PATENT DOCUMENTS

| | | |
|---|---|---|
| 2007/0099071 A1 | 5/2007 | Morgan et al. |
| 2008/0292962 A1* | 11/2008 | Jung ............................ 429/211 |
| 2009/0297929 A1 | 12/2009 | Uchida |
| 2010/0055558 A1 | 3/2010 | Choi et al. |
| 2011/0129722 A1 | 6/2011 | Yoneda |

FOREIGN PATENT DOCUMENTS

| | | |
|---|---|---|
| EP | 1 708 214 A2 | 10/2006 |
| JP | 1995-326336 A | 12/1995 |
| JP | 08-096829 | 4/1996 |
| JP | 2002-208442 | 7/2002 |
| JP | 2004-158344 | 6/2004 |
| JP | 2005-353519 A | 12/2005 |
| JP | 2007-299855 A | 11/2007 |
| JP | 2009-218540 A | 9/2009 |
| JP | 2009-532843 | 9/2009 |
| JP | 2009-283141 | 12/2009 |
| JP | 2010-020974 | 1/2010 |
| WO | WO 2007/114579 A1 | 10/2007 |
| WO | WO 2010/089152 A1 | 8/2010 |

OTHER PUBLICATIONS

SIPO Office action dated Nov. 1, 2013, for corresponding Chinese Patent application 201110281451.3, (9 pages).

JPO Office action dated Jun. 18, 2013, for corresponding Japanese Patent application 2011-168128, (3 pages).

Patent Abstracts of Japan, and English machine translation of Japanese Publication 08-096829, dated Apr. 12, 1996, (7 pages).

Patent Abstracts of Japan, and English machine translation of Japanese Publication 2002-208442, dated Jul. 26, 2002, (16 pages).

Patent Abstracts of Japan, and English machine translation of Japanese Publication 2004-158344, dated Jun. 3, 2004, (19 pages).

JPO Notice of Allowance dated May 13, 2014, for corresponding Japanese Patent application 2011-168128, (3 pages).

Patent Abstracts of Japan, and English machine translation for Japanese Publication 2009-283141 dated Dec. 3, 2009, listed above, (14 pages).

* cited by examiner

SECONDARY BATTERY AND MANUFACTURING METHOD THEREOF

CROSS-REFERENCE TO RELATED APPLICATION

This application claims priority to and the benefit of U.S. Provisional Patent Application No. 61/382,392, filed on Sep. 13, 2010 in the United States Patent and Trademark Office, the entire content of which is incorporated herein by reference.

BACKGROUND

1. Field

Aspects of embodiments of the present invention relate to a secondary battery and a manufacturing method thereof.

2. Description of the Related Art

Secondary batteries may be manufactured by spirally winding a positive electrode plate coated with a positive electrode active material, a separator, and a negative electrode plate coated with a negative electrode active material, or by housing an electrode assembly formed by sequentially stacking a positive electrode plate coated with a positive electrode active material, a separator, and a negative electrode plate coated with a negative electrode active material. In addition, secondary batteries may be classified into cylindrical types, prismatic types, or pouch types according to the external shape of a case accommodating the electrode assembly.

In a typical stack-type electrode assembly formed by stacking a positive electrode plate, a negative electrode plate, and a separator, the stacked positive and negative electrode plates may move or deform due to external impact or vibration, resulting in misalignment.

SUMMARY

According to aspects of embodiments of the present invention, a secondary battery and a method of manufacturing the secondary battery can maintain a positive electrode plate and a negative electrode plate in proper alignment even when an external impact or vibration is applied to an electrode assembly.

According to an embodiment of the present invention, a secondary battery includes: an electrode assembly including a first electrode plate including a first electrode collector and a first electrode tab protruding from a side of the first electrode collector; a second electrode plate including a second electrode collector and a second electrode tab protruding from a side of the second electrode collector; a first separator between the first electrode plate and the second electrode plate and including a central portion and an outer portion at a periphery of the central portion; and a second separator at a side of the first electrode plate or the second electrode plate opposite a side facing the first separator, the second separator including a central portion and an outer portion at a periphery of the central portion of the second separator, and the outer portion of the first separator and the outer portion of the second separator contact each other at least at a joining part; and a case containing the electrode assembly.

The joining part may contact at least one of the first and second electrode plates. In one embodiment, the joining part fixes at least one of the first and second separators and the at least one of the first and second electrode plates together.

The central portion of at least one of the first and second separators may contact at least one of the first and second electrode collectors.

In one embodiment, the joining part includes at least one first joining part at a first side of the outer portion of at least one of the first and second separators and at least one second joining part at a second side of the outer portion of the at least one of the first and second separators opposite the first side. The first side may be adjacent one or both of the first and second electrode collectors. The at least one first joining part may include a pair of first joining parts at opposite sides along a widthwise direction of an electrode tab of the first and second electrode tabs.

In one embodiment, the at least one first joining part includes a first pair of first joining parts at opposite sides along a widthwise direction, respectively, of the first electrode tab and contacting side portions of the first electrode tab and the side of the first electrode collector; and a second pair of first joining parts at opposite sides along a widthwise direction, respectively, of the second electrode tab and contacting side portions of the second electrode tab and the side of the second electrode collector.

The at least one second joining part may be at a central portion of the second side of the outer portion. In one embodiment, the at least one second joining part includes a pair of second joining parts at opposite ends of the second side intersecting third and fourth sides, respectively, of the outer portion of the at least one of the first and second separators, the third and fourth sides being opposite each other and connecting the first and second sides of the outer portion of the at least one of the first and second separators.

The joining part may include an ultrasonic welded part, a thermally fused part, or an adhesive. The first and second electrode collectors may be substantially plate-shaped and have substantially a same size. In one embodiment, at least one of the first and second separators is substantially plate-shaped, the central portion has a size corresponding to the size of the first and second electrode collectors, and the outer portion does not overlap the first and second electrode collectors. The case may be a pouch-type case. In one embodiment, a secondary battery further includes an insulation film between the case and at least one of the first and second electrode tabs.

According to another embodiment of the present invention, a method of manufacturing a secondary battery includes: preparing a first electrode plate including a first electrode collector and a first electrode tab protruding from a side of the first electrode collector; preparing a second electrode plate including a second electrode collector and a second electrode tab protruding from a side of the second electrode collector; preparing a first separator including a central portion and an outer portion at a periphery of the central portion; preparing a second separator including a central portion and an outer portion at a periphery of the central portion of the second separator; stacking the first electrode plate, the first separator, the second electrode plate, and the second separator, the first separator being between the first and second electrode plates, and the second separator being at a side of the first electrode plate or the second electrode plate opposite a side facing the first separator; and preparing a joining part at which the outer portion of the first separator and the outer portion of the second separator contact each other.

Preparing the joining part may include ultrasonic welding, thermal fusing, or applying an adhesive. Preparing the joining part may include contacting the joining part to at least one of the first and second electrode plates. In one embodiment, the joining part includes a plurality of joining parts, and preparing the joining part includes preparing at least one first joining part of the plurality of joining parts at a first side of the outer portion of at least one of the first and second separators, and preparing at least one second joining part of the plurality of joining parts at a second side of the outer portion of at least one of the first and second separators opposite the first side.

According to another embodiment of the present invention, a secondary battery includes an electrode assembly including a positive electrode plate having a positive electrode tab, a negative electrode plate having a negative electrode tab, and a separator interposed between the positive electrode plate and the negative electrode plate and having a central portion contacting the positive electrode plate or the negative electrode plate, and an edge portion extending outwardly from the central portion, a case for housing the electrode assembly, an upper welding part formed on an upper edge portion, where the positive electrode tab and the negative electrode tab are positioned, and a lower welding part formed on a lower edge portion opposite to the upper edge portion.

At least four of the upper welding part may be formed to contact side portions of each of the positive electrode tab and the negative electrode tab. The upper welding part may be formed to contact the upper sides of the positive electrode plate and the negative electrode plate.

The lower welding part may be formed at the center of the lower edge portion. The lower welding part may be formed to contact lower corners of the positive electrode plate or the negative electrode plate, respectively.

The upper welding part and the lower welding part may be subjected to ultrasonic welding.

The case may be a pouch-type case.

According to another embodiment of the present invention, a method of manufacturing a secondary battery includes an electrode plate preparing step of preparing a positive electrode plate having a positive electrode tab and a negative electrode plate having a negative electrode tab; a separator preparing step of preparing a separator having a central portion contacting the positive electrode plate or the negative electrode plate, and an edge portion extending outwardly from the central portion, and including an upper welding part formed on an upper edge portion, where the positive electrode tab and the negative electrode tab are positioned, and a lower welding part formed on a lower edge portion opposite to the upper edge portion; a stacking step of stacking the positive electrode plate, the negative electrode plate, and the separator; a welding step of welding the upper welding part and the lower welding part, respectively; and a housing step of housing a completed electrode assembly resulting after the welding step.

According to an aspect of embodiments of an electrode assembly, a secondary battery including the same, and a manufacturing method of the present invention, since a joining part is provided in a separator, the electrode assembly can maintain alignment between a first electrode plate and a second electrode plate even during an external impact or vibration, and, as a result, the cell stability of the battery can be enhanced while improving the life characteristic of the battery.

BRIEF DESCRIPTION OF THE DRAWINGS

The above and other features and advantages will become more apparent to those of ordinary skill in the art by describing in detail some exemplary embodiments of the present invention with reference to the attached drawings. Moreover, additional aspects and/or advantages of embodiments of the present invention are set forth in the following description and accompanying drawings, or may be obvious in view thereof to those skilled in the art.

Figure 1:
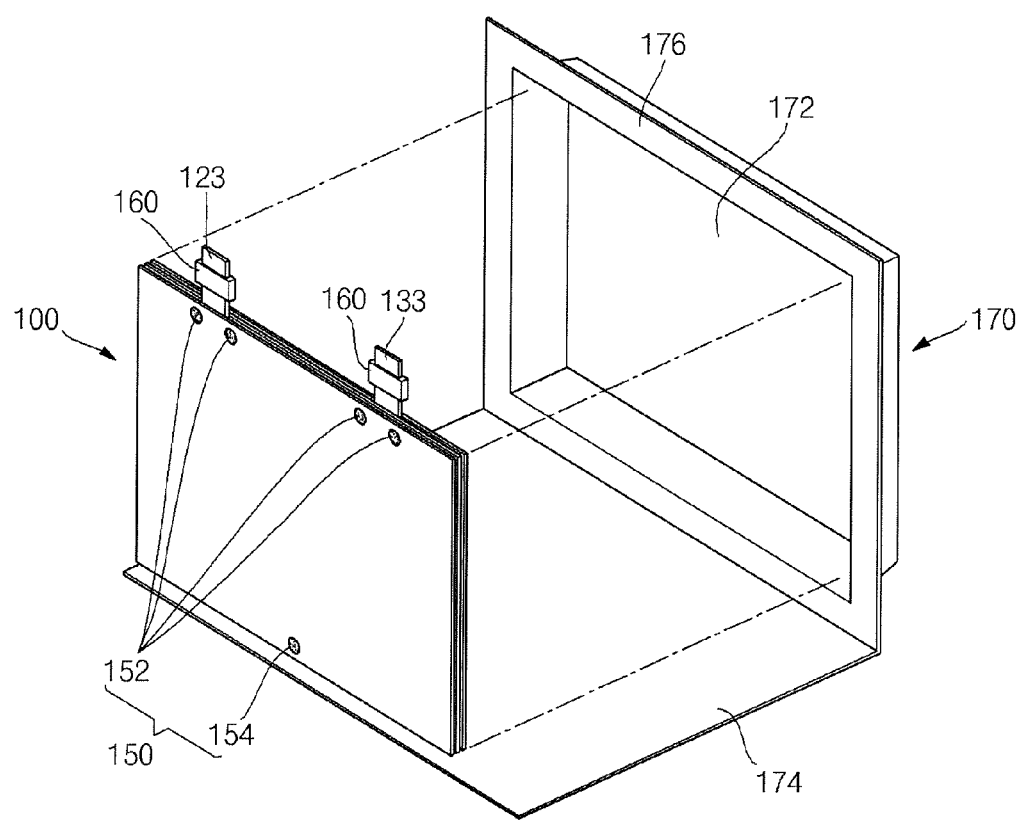
FIG. 1 is an exploded perspective view of a secondary battery according to an embodiment of the present invention.

| Description of Reference Numerals Indicating Some Elements in the Drawings | |
|---|---|
| 100: Secondary Battery | 110: Electrode Assembly |
| 120: First Electrode Plate | 130: Second Electrode Plate |
| 140: Separator | 150: Joining Part |

DETAILED DESCRIPTION

Some exemplary embodiments of a secondary battery and a manufacturing method thereof will now be described with reference to the accompanying drawings; however, embodiments of the present invention may be embodied in different forms and should not be construed as limited to the exemplary embodiments illustrated and set forth herein. Rather, these exemplary embodiments are provided by way of example for understanding of the invention and to convey the scope of the invention to those skilled in the art. As those skilled in the art would realize, the described embodiments may be modified in various different ways, all without departing from the spirit or scope of the present invention. Like reference numerals designate like elements throughout the specification and drawings.

An electrode assembly according to an embodiment of the present invention and a secondary battery including the same will first be described.

Figure 2:
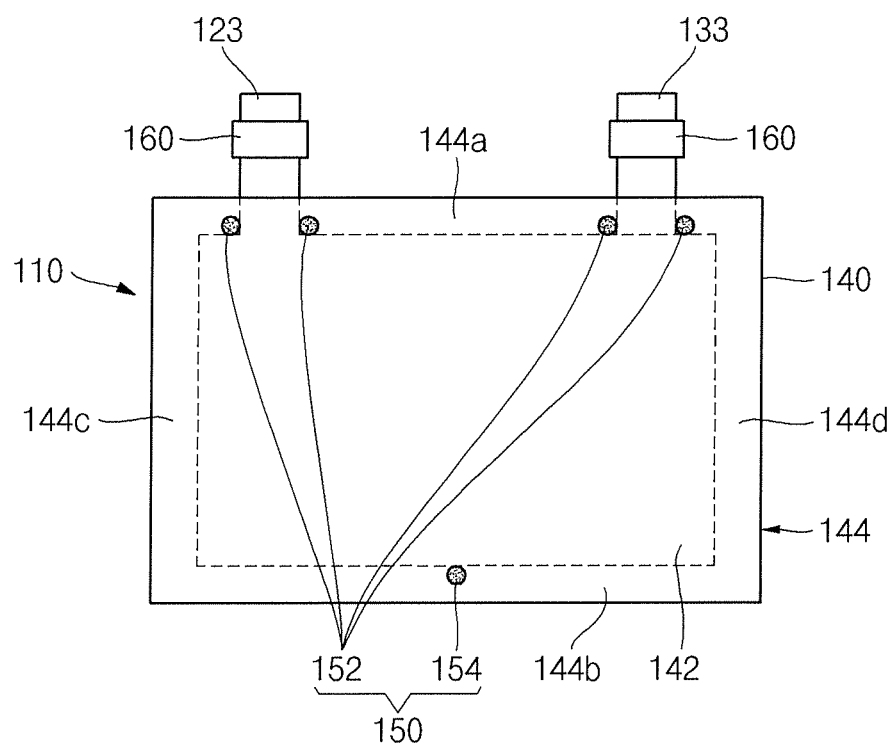
FIG. 2 is a front view of an electrode assembly of the secondary battery of FIG. 1 according to an embodiment of the present invention.
Figure 3:
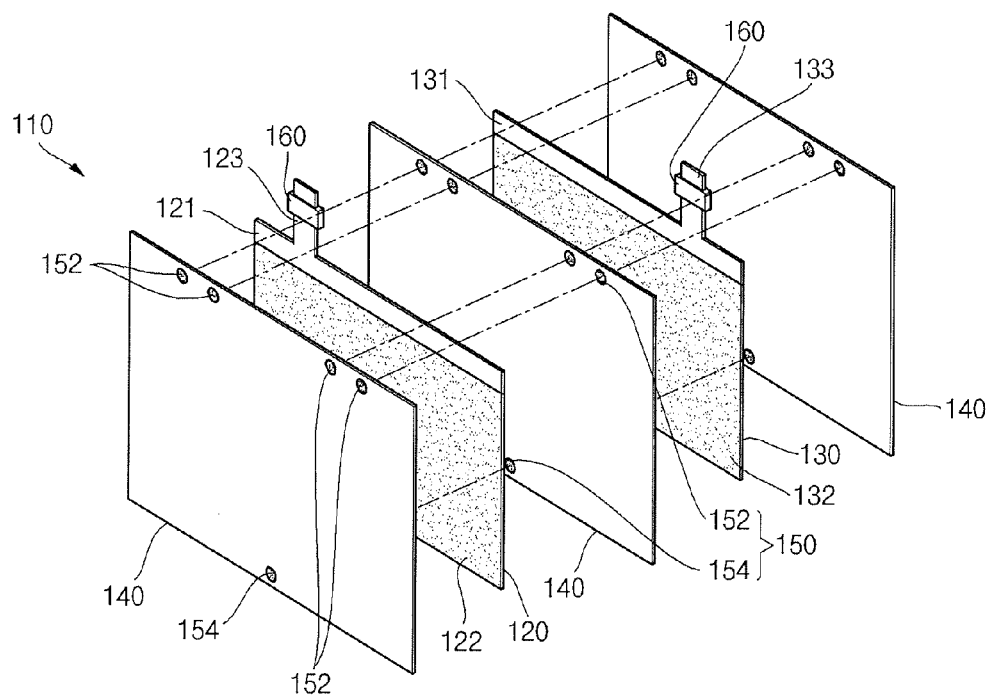
FIG. 3 is an exploded perspective view of the electrode assembly of FIG. 2.

FIG. 1 is an exploded perspective view of a secondary battery according to an embodiment of the present invention, FIG. 2 is a front view of an electrode assembly of the secondary battery shown in FIG. 1 according to an embodiment of the present invention, and FIG. 3 is an exploded perspective view of the electrode assembly shown in FIG. 2.

Referring to FIGS. 1 through 3, a secondary battery 100 includes an electrode assembly 110 and a case 170.

The electrode assembly 110 includes a first electrode plate 120 (e.g., a positive electrode plate), a second electrode plate 130 (e.g., a negative electrode plate), a separator 140, and a joining part 150. The electrode assembly 110, in one embodiment, further includes an insulation film 160.

The first electrode plate 120, in one embodiment, is formed by coating a first electrode active material layer 122 (e.g., a positive electrode active material layer) on both surfaces of a substantially plate-shaped first electrode collector 121 (e.g., a positive electrode collector). The first electrode collector 121 may be made of aluminum foil having excellent conductivity. In one embodiment, the first electrode plate 120 includes a first electrode tab 123 (e.g., a positive electrode tab) in the form of a protrusion on a side portion of the first electrode collector 121, and the first electrode active material layer 122 is coated on parts of the first electrode collector 121 excluding the first electrode tab 123 and predetermined portions under the first electrode tab 123. The first electrode active material layer 122 may be made of a laminate compound including lithium, a binder for increasing a binding force, and a conductive member for increasing conductivity.

The second electrode plate 130, in one embodiment, is formed by coating a second electrode active material layer 132 (e.g., a negative electrode active material layer) on both surfaces of a second electrode collector 131 (e.g., a negative electrode collector) that is substantially plate-shaped to correspond to the first electrode collector 121. The second electrode collector 131 may be made of copper (Cu) foil having excellent conductivity. In one embodiment, the second electrode plate 130 includes a second electrode tab 133 (e.g., a negative electrode tab) in the form of a protrusion on a side portion of the second electrode collector 131, and the second electrode active material layer 132 is coated on parts of the second electrode collector 131 excluding the second electrode tab 133 and predetermined portions under the second electrode tab 133. The second electrode active material layer 132 may be made of a hard carbon material including carbon or graphite, and a binder for increasing a binding force. In addition, the second electrode tab 133 is spaced apart from the first electrode tab 123.

The separator 140 is substantially plate-shaped to correspond to the first electrode plate 120 and/or the second electrode plate 130 and is generally sized to be slightly larger than the first electrode plate 120 and/or the second electrode plate 130. The separator 140 may be a porous film made of polyethylene (PE), polypropylene (PP), or a composite film thereof.

The separator 140, which is interposed between the first electrode plate 120 and the second electrode plate 130, electrically insulates the first electrode plate 120 and the second electrode plate 130 and passes charges of the first electrode plate 120 and the second electrode plate 130.

The separator 140 is positioned between the first electrode plate 120 and the second electrode plate 130, and includes a central portion 142 contacting the first electrode plate 120 and/or the second electrode plate 130, and an edge portion 144 extending outwardly from the central portion 142 while not overlapping the first electrode plate 120 or the second electrode plate 130. Further, the separator 140 (e.g., a first separator) may be adjacent another separator 140 (e.g., a second separator) that is arranged at a side of the first electrode plate 120 or the second electrode plate 130 opposite a side facing the separator 140 (i.e. the first separator).

The edge portion 144, in one embodiment, includes an upper edge portion 144*a* formed on an upper side of the central portion 142, a lower edge portion 144*b* formed on a lower side of the central portion 142, and left and right edge portions 144*c* and 144*d* formed on left and right sides, respectively, of the central portion 142.

The joining part 150, in one embodiment, includes an upper joining part 152 and a lower joining part 154.

The upper joining part 152, in one embodiment, is formed on the upper edge portion 144*a* where the first electrode tab 123 and the second electrode tab 133 are arranged.

In one embodiment, the upper joining part 152 is formed at locations corresponding to side portions (e.g., opposite side portions) of the first electrode tab 123 and side portions (e.g., opposite side portions) of the second electrode tab 133, so that at least four upper joining parts are formed.

In addition, the upper joining part 152, in one embodiment, is formed to contact upper sides of the first electrode plate 120 and/or the second electrode plate 130 while contacting side portions (e.g., opposite side portions) of each of the first electrode tab 123 and the second electrode tab 133.

The lower joining part 154, in one embodiment, is formed at or near the center of the lower edge portion 144*b* opposite to the upper joining part 152.

In addition, the lower joining part 154, in one embodiment, is formed to contact lower sides of the first electrode plate 120 and/or the second electrode plate 130.

The upper joining part 152 and the lower joining part 154, in one embodiment, are subjected to ultrasonic welding, respectively, thereby tightly fixing the stacked structure of the first electrode plate 120, the second electrode plate 130, and the separator 140. However, the upper joining part 152 and the lower joining part 154 are not limited to an ultrasonic welded part in embodiments of the present invention, but may be formed by any other suitable welded part, a thermally fused part, or an adhesive. Further, in one embodiment, the separator 140 (i.e. the first separator) and the adjacent separator 140 (i.e. the second separator) contact each other at the joining part 150 so that the joining part 150 fixes the stacked structure of the first electrode plate 120, the second electrode plate 130, and the adjacent separators 140.

Therefore, since the opposite sides of each of the first electrode tab 123 and the second electrode tab 133 are fixed by the upper joining part 152, the first electrode plate 120 and/or the second electrode plate 130 can be prevented or substantially prevented from moving to the sides (e.g., left and right), such as due to an external impact or vibration. In addition, since the upper sides of the first electrode plate 120 and/or the second electrode plate 130 are fixed by the upper joining part 152, the first electrode plate 120 and/or the second electrode plate 130 can be prevented or substantially prevented from moving upward.

Further, because the lower side of the first electrode plate 120 and/or the second electrode plate 130 is fixed by the lower joining part 154, the first electrode plate 120 and/or the second electrode plate 130 can be prevented or substantially prevented from moving downward, such as due to an external impact or vibration.

The lower joining part 154 may be positioned at any suitable location of the lower edge portion 144*b* as long as it is positioned within an intersecting region of the left and right edge portions 144*c* and 144*d*. In one embodiment, in order to fix the first electrode plate 120 and/or the second electrode plate 130 in a stable manner, the lower joining part 154 is positioned substantially at a center of the left and right edge portions 144*c* and 144*d*.

The insulation film 160 is configured to enclose the case 170 (e.g., a pouch-type case) described further below and the first electrode tab 123 and the second electrode tab 133 stacked for electrical insulation.

The case 170 will be described with regard to a pouch-type case according to one example embodiment of the present invention. However, embodiments of the present invention are not limited to a pouch-type case, and the case 170 may be formed of a cylindrical or prismatic can or case.

With reference to FIG. 1, the case 170, in one embodiment, includes a body 172 having an inner space in which the electrode assembly 110 is placed and having an electrolyte filled therein, and a cover 174 integrally extending from one end of the body 172. In one embodiment, a flange 176 is formed at an edge of the body and is joined with the cover 174 to hermetically seal the body 172.

As described above, in the electrode assembly 110 according to an embodiment of the present invention and the secondary battery 100 including the same, due to the joining part 150 in the separator 140, when an external impact or vibration is applied to the electrode assembly 110, alignment between the first electrode plate 120 and the second electrode plate 130 can be maintained and the stability of the battery cell can be enhanced while improving the life characteristic of the battery.

Next, an electrode assembly according to another embodiment of the present invention and a secondary battery including the same will be described.

Since functional components of the illustrated embodiment are substantially the same as those of the electrode assembly 110 according to the previously described embodiment, with the exception of a lower joining part, descriptions of the same components will be omitted.

Figure 4:
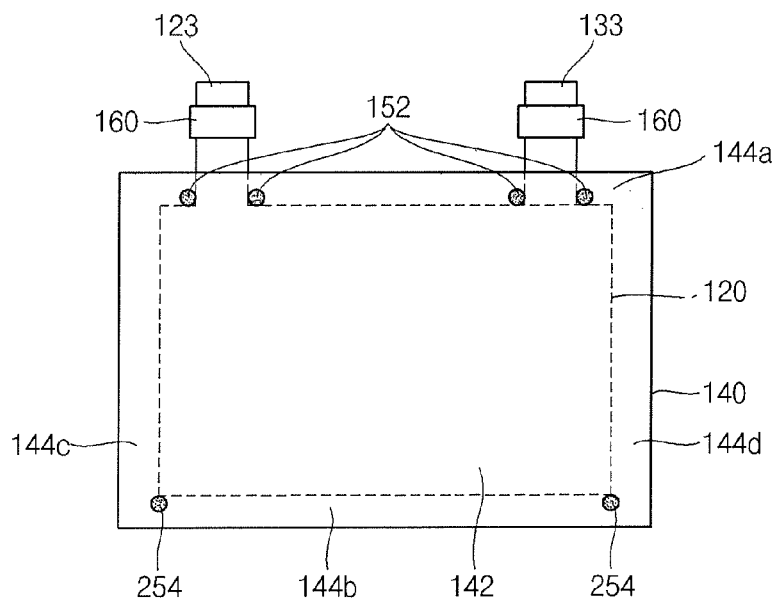
FIG. 4 is a front view of an electrode assembly of a secondary battery according to another embodiment of the present invention.

FIG. 4 is a front view of an electrode assembly of a secondary battery according to another embodiment of the present invention.

Referring to FIG. 4, in one embodiment, lower joining parts 254 are formed at intersections of the lower edge portion 144b and the left and right edge portions 144c and 144d, respectively. That is, the lower joining parts 254 are formed around lower corners of both sides of the first electrode plate (120 of FIG. 3) and/or the second electrode plate (130 of FIG. 3). In an exemplary embodiment, the lower joining parts 254 are formed to contact lower corners of both sides of the first electrode plate 120 and/or the second electrode plate 130.

When the first electrode plate 120, the second electrode plate 130, and the separator 140 are stacked, and joining is performed on the upper joining part 152 and the lower joining part 254, left and right and downward movements of the first electrode plate 120 and/or the second electrode plate 130 can be prevented or substantially prevented by the lower joining part 254.

A method of manufacturing a secondary battery according to an embodiment of the present invention will now be described.

Figure 5:
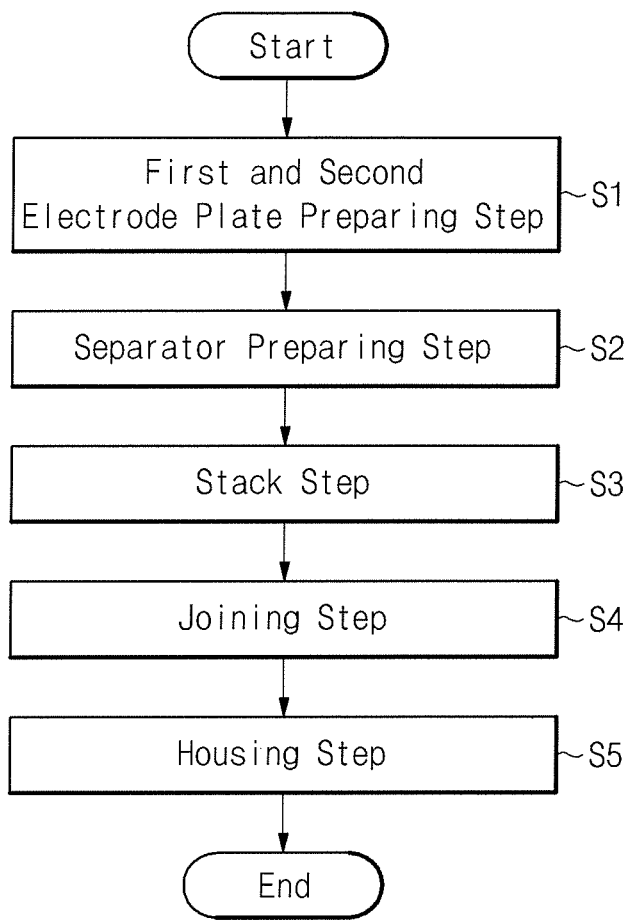
FIG. 5 is a flowchart illustrating a method of manufacturing a secondary battery according to an embodiment of the present invention.

FIG. 5 is a flowchart illustrating a method of manufacturing a secondary battery according to an embodiment of the present invention.

Referring to FIGS. 1 through 5, an assembly for preventing or substantially preventing an electrode from moving may include a first (e.g., positive) and second (e.g., negative) electrode plate preparing step (S1), a separator preparing step (S2), a stacking step (S3), a joining step (S4), and a housing step (S5). Of course, the above-described steps of the method of manufacturing a secondary battery according to the present invention is not limited to carrying out the above-described steps, or tasks, in the above-listed order or as shown in FIG. 5. For example, the first (e.g., positive) and second (e.g., negative) electrode plate preparing step (S1) may be performed after the separator preparing step (S2).

In the first and second electrode plate preparing step (S1), as described above with regard to the first electrode plate 120 and the second electrode plate 130, the first electrode plate 120 having the first electrode collector 121, the first electrode active material layer 122 and the first electrode tab 123, and the second electrode plate 130 having the second electrode collector 131, the second electrode active material layer 132 and the second electrode tab 133, are prepared.

In the separator preparing step (S2), the separator 140 including the central portion 142, which is an overlapping area with the first electrode plate 120 and/or the second electrode plate 130, and the edge portion 144 extending outwardly from the central portion 142, is prepared. The separator 140 has the upper joining part 152 formed on the upper edge portion 144a of the edge portion 144, where the first electrode tab 123 and the second electrode tab 133 are positioned, and the lower joining part 154 formed on the lower edge portion 144b opposite to the upper edge portion 144a. However, the joining part 150 is yet to be formed in this step.

In the stacking step (S3), the first electrode plate 120, the second electrode plate 130, and the separator 140 provided through the first and second electrode plate preparing step (S1) and the separator preparing step (S2) are stacked. That is to say, the separator 140 is interposed between the first electrode plate 120 and the second electrode plate 130 and aligned with respect to (e.g., aligned on centers of) the respective electrode plates for stacking.

In the joining step (S4), the upper joining part 152 and the lower joining part 154 are joined, respectively, such as by welding (e.g., ultrasonic welding), thermal fusing, or applying an adhesive.

The joining may be ultrasonic welding, but the type of the joining is not limited to ultrasonic welding.

In the housing step (S5), according to one embodiment, the completed electrode assembly 110 resulting after the joining step (S4) is housed in the case 170, and an electrolyte is injected into the case 170, followed by hermetically sealing.

Some exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery comprising:
an electrode assembly comprising:
  a first electrode plate comprising a first electrode collector and a first electrode tab protruding from a side of the first electrode collector;
  a second electrode plate comprising a second electrode collector and a second electrode tab protruding from a side of the second electrode collector;
  a first separator between the first electrode plate and the second electrode plate and comprising a central portion and an outer portion at a periphery of the central portion; and
  a second separator at a side of the first electrode plate or the second electrode plate opposite a side facing the first separator, the second separator comprising a central portion and an outer portion at a periphery of the central portion of the second separator,
  wherein the outer portion of the first separator and the outer portion of the second separator contact each other at least at a joining part, the joining part contacting at least one of the first and second electrode collectors; and
a case containing the electrode assembly,
wherein the joining part comprises at least one first joining part at a first side of the outer portion of at least one of the first and second separators and at least one second joining part at a second side of the outer portion of the at least one of the first and second separators opposite the first side,
wherein the at least one first joining part comprises:
a pair of first joining parts at opposite sides along a widthwise direction, respectively, of the first electrode tab and contacting side portions of the first electrode tab and the side of the first electrode collector,
wherein the secondary battery further comprises a third separator at a side of the other of the first electrode plate or the second electrode plate opposite a side facing the first separator, the third separator comprising a central portion and an Outer portion at a periphery of the central portion of the third separator, and wherein the outer portion of the first separator and the outer portion of the third separator contact each other at least at another joining part, the another joining part comprising:
a pair of third joining parts at a first side of the outer portion of at least one of the first and third separators corresponding to the first side of the outer portion of the at least one of the first and second separators, the pair of third joining parts being at opposite sides along a widthwise direction, respectively, of the second electrode tab and contacting side portions of the second electrode tab and the side of the second electrode collector.

2. The secondary battery of claim 1, wherein the joining part fixes at least one of the first and second separators and the at least one of the first and second electrode collectors together.

3. The secondary battery of claim 1, wherein the central portion of at least one of the first and second separators contacts at least one of the first and second electrode collectors.

4. The secondary battery of claim 1, wherein the first side is adjacent one or both of the first and second electrode collectors.

5. The secondary battery of claim 1, wherein the at least one second joining part is at a central portion of the second side of the outer portion.

6. The secondary battery of claim 1, wherein the at least one second joining part comprises a pair of second joining parts at opposite ends of the second side intersecting third and fourth sides, respectively, of the outer portion of the at least one of the first and second separators, the third and fourth sides being opposite each other and connecting the first and second sides of the outer portion of the at least one of the first and second separators.

7. The secondary battery of claim 1, wherein the joining part comprises an ultrasonic welded part, a thermally fused part, or an adhesive.

8. The secondary battery of claim 1, wherein the first and second electrode collectors are substantially plate-shaped and have substantially a same size.

9. The secondary battery of claim 8, wherein at least one of the first and second separators is substantially plate-shaped, the central portion has a size corresponding to the size of the first and second electrode collectors, and the outer portion does not overlap the first and second electrode collectors.

10. The secondary battery of claim 1, wherein the case is a pouch-type case.

11. The secondary battery of claim 1, further comprising an insulation film between the case and at least one of the first and second electrode tabs.

12. A method of manufacturing a secondary battery, the method comprising:
preparing a first electrode plate including a first electrode collector and a first electrode tab protruding from a side of the first electrode collector;
preparing a second electrode plate including a second electrode collector and a second electrode tab protruding from a side of the second electrode collector;
preparing a first separator including a central portion and an outer portion at as periphery of the central portion;
preparing a second separator including a central portion and an outer portion at a periphery of the central portion of the second separator;
stacking the first electrode plate, the first separator, the second electrode plate, and the second separator, the first separator being between the first and second electrode plates, and the second separator being at a side of the first electrode plate or the second electrode plate opposite a side facing the first separator; and
preparing a joining part at which the outer portion of the first separator and the outer portion of the second separator contact each other, the joining part contacting at least one of the first and second electrode collectors,
wherein the joining part comprises at least one first joining part at a first side of the outer portion of at least one of the first and second separators and at least one second joining part at a second side of the outer portion of the at least one of the first and second separators opposite the first side,
wherein the at least one first joining part comprises:
a pair of first joining parts at opposite sides along a widthwise direction, respectively, of the first electrode tab and contacting side portions of the first electrode tab and the side of the first electrode collector,
wherein the secondary batter further comprises a third separator at a side of the other of the first electrode plate or the second electrode plate opposite a side facing the first separator, the third separator comprising a central portion and an outer portion at a periphery of the central portion of the third separator, and
wherein the outer portion of the first separator and the outer portion of the third separator contact each other at least at another joining part, the another joining part comprising:
a pair of third joining parts at a first side of the outer portion of at least one of the first and third separators corresponding to the first side of the outer portion of the at least one of the first and second separators, the pair of third joining parts being at opposite sides along a widthwise direction, respectively, of the second electrode tab and contacting side portions of the second electrode tab and the side of the second electrode collector.

13. The method of claim 12, wherein preparing the joining part comprises ultrasonic welding, thermal fusing, or applying an adhesive.

* * * * *